May 10, 1966 CHAO CHEN WANG 3,251,001

BROADBAND COUPLING CIRCUIT FOR ELECTRON BEAM PARAMETRIC AMPLIFIER

Filed May 20, 1963 2 Sheets-Sheet 1

INVENTOR.
CHAO CHEN WANG
BY
John H. Gallagher
ATTORNEY

INVENTOR.
CHAO CHEN WANG
BY
John H. Gallagher
ATTORNEY 3,251,001

BROADBAND COUPLING CIRCUIT FOR ELECTRON BEAM PARAMETRIC AMPLIFIER

Chao Chen Wang, Mineola, N.Y., assignor to Sperry Rand Corporation, Great Neck, N.Y., a corporation of Delaware Filed May 20, 1963, Ser. No. 281,512
13 Claims. (Cl. 330—4.7)

This invention relates to an electron beam parametric amplifier and more particularly to coupling circuits for coupling transverse mode electromagnetic waves from traveling wave circuits to the fast cyclotron wave of an axially-directed electron beam.

The achievement of amplification in electron beam devices by the phenomenon of fast cyclotron wave parametric amplification has stimulated considerable interest in these types of devices, primarily because they inherently are characterized by a lower noise figure than that of the conventional traveling wave tube which achieves amplification by virtue of energy exchange between the electron beam and a slow space charge wave.

In the fast cyclotron wave parametric amplifier an axially-directed electron beam is immersed in a steady axial magnetic field of the correct strength to produce a rotational motion of the electrons at a cyclotron resonance frequency when the electrons are subjected to a transversely directed electric field of a component of a signal wave. Amplification is imparted to the fast cyclotron beam wave in the form of increased radius of rotation of the electrons. This may be accomplished by means of an electric field rotating at a frequency twice the rate of the fast cyclotron wave. This rotating electric field is established by a suitable structure that is excited by a pump signal at a frequency twice the signal frequency. The amplified fast cyclotron wave is coupled from the beam to an external circuit by means of an output coupler that is substantially identical to the input coupler. The low noise feature arises from the fact that noise on the fast cyclotron beam wave at the signal frequency couples onto the input coupler and may be externally terminated.

It is known that the parametric amplification process, by itself, inherently is broadband, so that the operating bandwidth of the fast cyclotron wave parametric amplifier is a function of the bandwidths of the input and output signal wave couplers. These couplers must be capable of supporting transverse electric fields of high strength in regions occupied by the beam in order to achieve efficient coupling of signal waves to and from the fast cyclotron beam wave. This requirement for the coupler circuit often is expressed as a high transverse interaction impedance. This high electric field, or high transverse interaction impedance, has been achieved in the past by lumped constant resonant devices of the Cuccia coupler type, or by standing wave resonant cavities. These devices, however, inherently are narrow band devices and limit the operating bandwidth of the amplifier. Traveling wave circuits having relatively broader frequency characteristics have been proposed for the signal wave couplers, but so far as is known, none of these have possessed a suffiviently high transverse interaction impedance at low operating phase constant $\beta_p$ to make them useful in practical amplifiers. A low operating phase constant is necessary to minimize the noise and attenuation of the signal on the fast cyclotron beam wave. In addition to the low phase constant and the high transverse interaction impedance over a relatively wide frequency range, the traveling wave coupler must possess a finite and relatively constant group velocity over a relatively wide frequency range in order to maintain synchronism between the phase velocity of the signal wave and the beam velocity. Further, the traveling wave coupler should have phase velocity characteristic in the signal frequency range of interest that are sufficiently different from those of the noisy slow cyclotron wave and the space charge waves to avoid coupling thereto.

It therefore is an object of this invention to provide broadband signal coupling circuits for use in an electron beam fast cyclotron wave parametric amplifier.

Another object of this invention is to provide a traveling wave coupling circuit having high interaction impedance for use in an electron beam parametric amplifier.

A further object of this invention is to provide efficient traveling wave coupling means whose propagation characteristics maintain synchronism over a relatively broad range of frequencies between a transverse mode signal wave component propagating on the coupling means and the fast cyclotron wave of an axial electron beam.

It is another object of this invention to provide a traveling wave signal wave coupler circuit for an electron beam parametric amplifier that has a high interaction impedance and a fast phase velocity.

A further object of this invention is to provide a traveling wave signal wave coupler circuit for an electron beam parametric amplifier that is short in length and introduces a minimum amount of attenuation to the signal propagating on the fast cyclotron wave of the electron beam.

Another object of this invention is to provide a signal wave coupler for an electron beam parametric amplifier that is relatively short in length, has a relatively high transverse interaction impedance at a low operating phase constant.

These and other objects and advantages of the present invention are achieved by providing a signal coupling circuit comprised of a multifilar helix-like structure having a dumbbell shaped cross-section comprised of closely-spaced, parallel, transversely-extending central portions and circularly-shaped end portions on opposite ends of the central portions. The electron beam axis extends centrally and symmetrically between the transverse central portions of the couplers. The multifilar helix is electrically excited and physically arranged so that the electric field of the traveling signal waves propagating thereon is substantially transverse to the beam axis in the region occupied by the beam. The dumbbell shaped multifilar helix serves to concentrate the signal wave electric field in the region between the closely spaced transverse portions, this being the region occupied by the electron beam, thus providing a broadband, high transverse interaction impedance traveling wave circuit. The coupling circuit also has high phase velocity (low phase constant) and short length, thus causing minimum attenuation of the signal on the fast cyclotron beam wave and minimizing the noise on the fast cyclotron wave.

The present invention will be described by referring to the accompanying drawings wherein.

Figure 1:
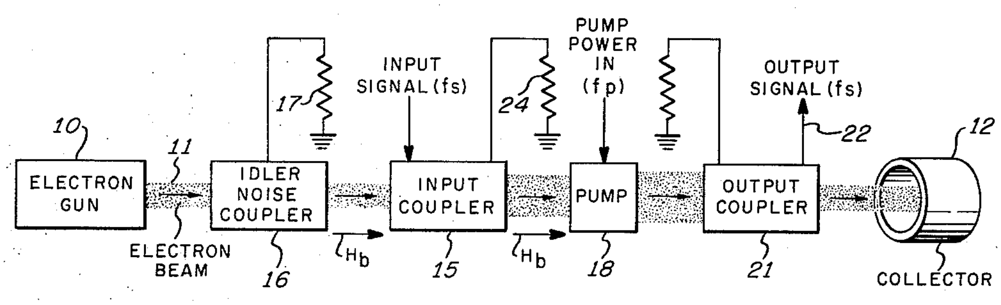
FIG. 1 is a simplified block illustration of a fast cyclotron wave parametric amplifier in which the coupling circuit of the present invention may be used.

Referring now in particular to the drawings, FIG. 1 is a simplified illustration in block form of a non-degenerate type of fast cyclotron wave parametric amplifier in which the coupling circuit of the present invention is employed.

A low noise electron gun 10 of conventional design produces an axially-directed solid electron beam 11 which is terminated at the right by a collector electrode 12, which also may be of conventional design. Electron beam 11 is immersed in an axially-directed steady magnetizing field $H_b$ which is of sufficient strength to cause the electrons of the beam to orbit at a desired cyclotron resonance frequency $f_c$ when subjected to a transversely directed force. This force is supplied by a transversely directed electric field propagating on input coupler 15 which serves to couple input signal waves at a frequency $f_s$ to the fast cyclotron wave of the electron beam 11. Input coupler 15 not only substantially completely couples the input signal waves to the fast cyclotron wave of the beam, but it also substantially completely couples or strips from the fast cyclotron wave the noise in the signal frequency range. The stripped noise is terminated in an external impedance 24. Noise on the fast cyclotron beam wave in the idler frequency range $f_i$ is coupled or stripped from the beam by means of idler noise coupler 16. This noise is then terminated in external matched impedance 17. The transverse electric field of the input signal waves on input coupler 15 causes the electrons of the beam to orbit in a helical path and the radii of these orbiting electrons are increased by means of a rotating electric field on a pump structure 18 which is driven by a pump signal at a frequency $f_p$.

Electron beam 11 next encounters output coupler 21 which is substantially identical to input coupler 15, and which operates to couple the amplified fast cyclotron wave from the beam and makes this amplified signal available on transmission line 22 for use in an external circuit.

Figure 2:
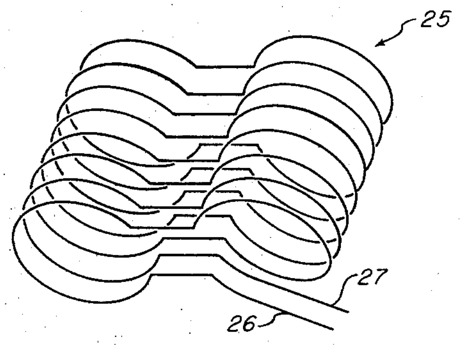
FIG. 2 is a perspective view of an embodiment of the signal wave coupler of this invention.
Figure 3:
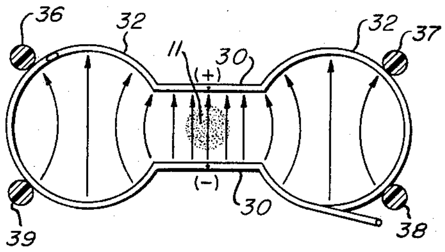
FIGS. 3 and 4 are transverse and axial sectional views of the coupler illustrated in FIG. 2.
Figure 4:
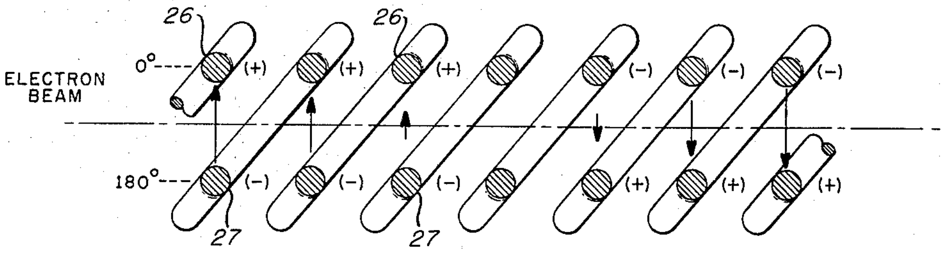

In order that the parametric amplifier operate over a relatively wide frequency range, it is required that input coupler 15 and output coupler 21 operate efficiently over a relatively wide frequency range. The broadband traveling wave coupler 25 of this invention is illustrated in FIG. 2 and is comprised of two conductive wires or ribbons 26 and 27 wound in a helix-like manner to form a modified bifilar helix having a dumbbell cross-sectional shape as illustrated in FIG. 3. Each convolution of the bifilar helix is comprised of upper and lower straight horizontal central portions 30 which desirably extend solely transversely with respect to the electron beam 11 which passes therebetween. In the preferred embodiment of the invention, horizontal portions 30 have no component of their lengths parallel to the axis of beam 11, and the pitch or lead of the modified helix is made up solely in the circularly-shaped end portions 32 whose diameters are greater than the transverse distance between the horizontal central portions 30. Because the horizontally-extending central portions 30 of the dumbbell shaped helix are relatively close together, the electric field of the signal waves supported by the bifilar dumbbell-shaped helix is concentrated in the central region occupied by the solid electron beam 11, as illustrated in FIG. 3, and it is this feature of the structure that provides the high transverse interaction impedance that is required for efficient coupling of the signal waves to the fast cyclotron wave of the beam. Because there are substantially no axial components in the electric field of the signal frequency waves in the region of the coupler occupied by electron beam 11, the coupling of the signal waves to space charge waves having longitudinal components is negligible. Further, the transverse electric field is symmetrical with respect to the beam axis and therefore will cause negligible velocity spread in the electron beam, and as will be explained hereinafter, this feature minimizes noise and attenuation of the signal on the beam wave. Although it is preferable that the central portions 30 have no axial components in their lengths, successful operation with a minimum of coupling to undesired components of the beam waves may be achieved if in fact axial components are present. A standard bifilar circular helix was deformed to the shape illustrated in FIG. 2 and operated satisfactorily.

In accordance with standard practice, the length of the modified bifilar helical coupler 25 is proportioned to equal the so-called Kompfner dip length in order to accomplish substantially complete signal coupling to the beam, and in order to substantially completely strip signal frequency noise from the fast cyclotron wave of the beam.

The two wires of bifilar helix 25 are electrically excited 180° out of phase with respect to each other and the electrical distance around one turn of the helix and the pitch of the helix are proportioned with regard to the frequency of the signal waves so that the signal waves propagate on the coupler in the first space harmonic component ($n=1$) of the odd bifilar helix mode that has a strong transverse electric field and negligible longitudinal field. The above-named quantities also are proportioned to achieve synchronism between the phase velocity of the first space harmonic component of signal waves on the bifilar coupler and the fast cyclotron wave of the beam over a wide frequency range, this phase velocity being far removed from the phase velocities of other components of the odd bifilar helix mode and other undesired modes in order to avoid coupling thereto. Because the circularly-shaped end portions 32, FIG. 3, are not in the interaction region of the electron beam 11 and the transverse component of the signal waves concentrated between horizontal portions 30, and because the fields of the signal waves are relatively weak in those end portions, the circumferential lengths of these circular portions 32, and their axial pitch may be varied independently to achieve the desired group and phase velocities without appreciably affecting the transverse interaction impedance of the circuit, and without disturbing the purely transverse field in the beam-wave interaction region between the horizontal portions 30 of the coupling circuit 25. The bifilar helix 25 is supported by the four axially-extending dielectric rods 36–39 which have machined grooves along their lengths to assure the correct spacing and alignment of the turns of multifilar helix 25.

In a signal wave coupler constructed in the manner illustrated in FIGS. 2 and 3, the ratio of the lengths of the transverse central portions 30 to the electron beam diameter was approximately 2:1, and in most instances, high interaction impedance may be achieved with ratios as large as 4:1, although the lower ratios are preferred. It is not absolutely necessary that the central portions 30 be straight as illustrated. Other suitable arrangements may be employed to provide the symmetrically oriented electric field that is concentrated in the region occupied by beam 11.

To more fully appreciate the advantages achieved with the coupler circuit of the present invention, attention now will be directed to some theoretical and design concepts relating to parametric amplifiers and beam-wave coupling. Because the primary advantage to be achieved in the use of a parametric amplifier is reduction of noise level in relationship to the signal level, attention must be directed to considerations that affect the noise and signal attenuation on the fast cyclotron beam wave. It is known that the attenuation of the signal on the fast cyclotron beam wave and the failure of the signal wave coupler to completely remove noise from the fast cyclotron beam wave are due in large part to variations in the axial velocities of the electrons of the beam, and that these velocity variations arise because of variations in thermal velocities of electrons, potential variations due to space charge, and potential variations due to electric and magnetic lense effects. All of these factors are a function of $(\beta_p L_k)^2$ which is the total phase shift through the coupler of length $L_k$, and which may be considered a figure of merit of a signal wave coupler; the lower this factor the better the coupler. For this reason it is desirable to have a signal wave coupler that has a low phase constant $\beta_p$ at a phase velocity $v_p$ that is synchronous with the fast cyclotron beam wave. It also is desirable that the coupler have a high transverse interaction impedance $Z_t$ since the Kompfner dip length $L_k$ of the coupler, for a plane polarized wave, is related to the transverse interaction impedance by the expression:

$$L_k=\pi\sqrt{2\frac{V_o}{I_o}\cdot\frac{\omega_c}{\omega}\cdot\frac{1}{\beta_p^2 Z_t}} \quad (1)$$

where $V_0$ and $I_0$ are respectively the beam voltage and current, $\omega_c$ is the angular cyclotron resonance frequency, and $\omega$ is the angular frequency of the signal waves, The cyclotron resonance frequency $\omega_c$ is equal to $e/m$ $Bo$, where $e/m$ is the charge to mass ratio of an electron and $Bo$ is the strength of the axial magnetic focussing field of the tube.

I have found it to be a property of the circuit of this invention that as the phase constant $\beta_p$ of the circuit is decreased the transverse interaction impedance $Z_t$ increases. This property therefore permits the product $\beta_p^2 Z_t$ to remain large so as to permit the use of a coupler circuit of short length $L_k$. Correspondingly, and of primary importance, the decrease in the value of $\beta_p$ while holding $L_k$ relatively constant, decreases the product $(\beta_p L_k)^2$ so as to reduce the noise and signal attenuation on the fast cyclotron beam wave, thus improving the important considerations in the operating characteristics of an electron beam parametric amplifier.

Figure 5:
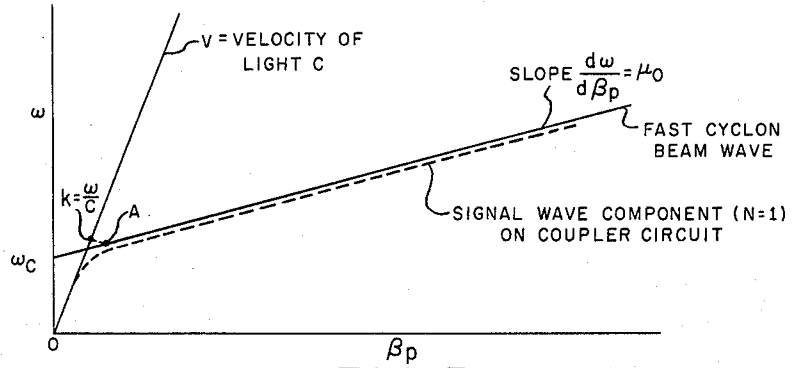
FIGS. 5 and 6 are graphs illustrating operating characteristics of the coupler of this invention.

These considerations relating to the values of $(\beta_p L_k)^2$ and $\beta_p^2 Z_t$ must, of course, be consistent with other characteristics of the signal wave coupler and beam characteristics which are required in order to achieve parametric amplification. In order to achieve parametric amplification in a fast cyclotron wave parametric amplifier, the following relationships and identities must hold:

$$\beta_p=\frac{\omega}{v_p}=\frac{\omega}{u_o}-\frac{\omega_c}{u_o} \quad (2)$$

$$\frac{\omega}{u_o}=\frac{\omega_c}{u_o}+\beta_p \quad (3)$$

$$\omega=\omega_c+\beta_p u_o \quad (4)$$

where $v_p$ is the phase velocity of the waves on the signal wave coupler circuit and $u_o$ is the D.C. beam velocity. The relationships of Equations 2–4 are graphically illustrated in the $\omega-\beta$ plot of FIG. 5, wherein it is seen that the straight line curve for the fast cyclotron beam wave has an $\omega$ intercept at $\beta_p=0$ that is equal to $\omega_c$, the cyclotron resonance frequency of the electrons in the beam. This is a verification of the condition expresed in Equation 4. In order that the coupler circuit of this invention operate in synchronism with the fast cyclotron beam wave over a broad range of frequencies, it is necessary that Equation 4 hold true over a broad range of frequencies. In terms of the graph of FIG. 5, this means that the curve for the signal wave on the coupler circuit must be as nearly coincident as possible to the fast cyclotron wave curve over a considerable portion of their lengths, and in accordance with the previous discussion it is necessary that this substantial coincidence commence at a value of phase constant $\beta_p$ as low as possible. This condition is illustrated in FIG. 5 wherein substantial coincidence between the two curves commences at the point A which is close to the velocity of light line illustrated thereon. The projection of the point A onto the velocity of light line defines the point $k=\omega/c$, the term $k$ having a physical significance that will be discussed hereinbelow.

It is desirable in a beam parametric amplifier that the $\omega_c$ intercept on the $\omega$ axis of FIG. 5 be significantly above the zero horizontal axis, this requirement being consistent with the required operating voltage and focussing magnetic field of beam, as well as physical size considerations for the tube. The cyclotron resonance frequency $\omega_c$ is a function of the axis magnetic field that focusses the electron beam, and a low value of $\omega_c$ requires an axial magnetic field of low strength. However, this weak field may not be sufficient to properly focus the electron beam. For this reason both the fast cyclotron wave curve and the curve for the signal wave on the coupler circuit both should intercept the $\omega$ coordinate axis at a region significantly above the horizontal axis. In practice, the curve for an open, or unshielded signal wave coupler circuit tends to merge with the velocity of light line, so that in keeping with the previous statement, the curve for the signal wave on the coupler should be selected so that the tangent to its linear portion has substantially the same intercept on the $\omega$ axis as the curve of the fast cyclotron wave.

Figure 6:
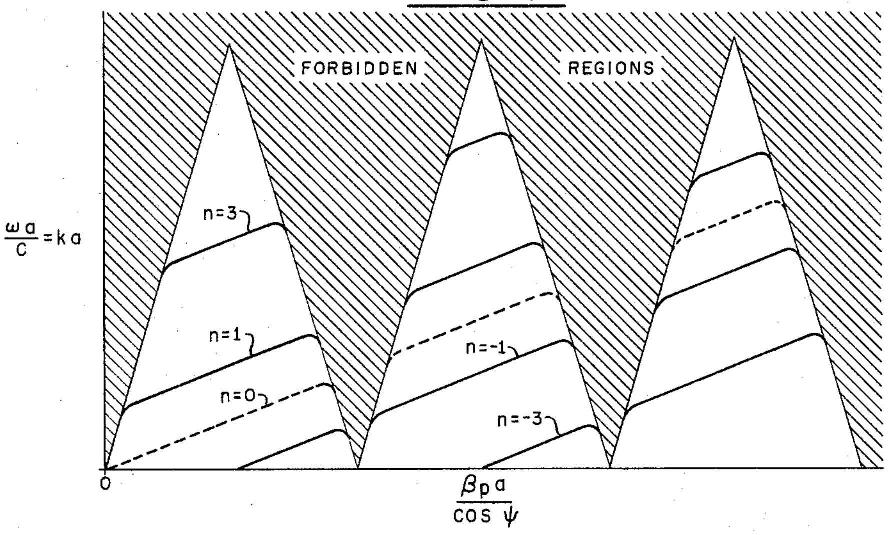

The curve in FIG. 5 for the signal wave on the coupler is the curve of the first space harmonic component ($n=1$) of the odd bifilar helix mode which is shown in FIG. 5 as one curve of a family of curves. Because the two wires of bifilar helix 25 of FIG. 2 are electrically excited in 180° phase relationship, i.e., an odd bifilar helix mode, substantially only odd numbered harmonic components will exist on the bifilar helix. The family of curves illustrated by solid lines in FIG. 6 have positive slopes and represent the odd numbered harmonic components which have positive phase velocities. The curve $n=0$, which is illustrated by a broken line in FIG. 6, is the curve for the fundamental component of the even bifilar helix mode and is illustrated for comparison only since it is a longitudinal field component and will not be present in the odd bifilar helix mode. For a detailed explanation of bifilar helix modes, reference is made to an article entitled, "Bifilar Helix for Backward Wave Oscillators," by Tien, pages 1137–1143, Proceedings of the IRE, July, 1954.

In the design of a coupler circuit, in accordance with the teachings of this invention, it is necessary to choose one curve of the family of curves in FIG. 6 that will be substantially coincident with the fast cyclotron wave curves of FIG. 5 over an appreciable frequency range, and this coincidence should commence at a low value of $\beta_p$. It will be seen that the first spaced harmonic component ($n=1$) curve has the characteristics desired. Therefore, the parameters of the coupler circuit and the beam characteristics are chosen to assure the desired relationships. In choosing the correct parameters for the coupler circuit, the equation for the curves of FIG. 6 are employed. This equation is as follows:

$$\frac{\omega a}{c}=ka=\beta_p a \sin\psi+n\cos\psi \quad (5)$$

where $c$ is the velocity of light, $k$ is equal to $\omega/c$, the term $ka$ is the ratio of the helix circumference to the free space wavelength of the signal waves, i.e., a quantity directly proportional to $\omega$, $2\pi a$ is the circumference of the bifilar helix, $n$ is the number of the space harmonic component and is equal to 1 in this discussion, and $\psi$ is the pitch angle of the bifilar helix.

By substituting Equation 2 into Equation 5, a relationship between electron beam characteristics and the signal wave on the coupler is obtained as follows:

$$ka=\left(\frac{\omega}{u_0}-\frac{\omega_c}{u_0}\right)a\sin\psi+n\cos\psi \quad (6)$$

From Equation 6 the following relationships may be derived:

$$\sin\psi=\frac{u_0}{c} \quad (7)$$

$$\cot\psi=\frac{\omega_c a}{u_0} \quad (8)$$

These expressions are helpful design equations since Equation 7 relates the pitch of the bifilar helix to the synchronous beam velocity and Equation 8 relates the bifilar helix physical parameters to the axial magnetic field which determines $\omega_c$. By selecting the correct parameters for Equations 6, 7 and 8, the correct slope and a correct $ka$ intercept may be selected for one of the harmonic component curves to match the slope and the $\omega_c$ intercept of the fast cyclotron wave curve of FIG. 5.

A further advantage that is obtained by the signal wave coupler circuit of this invention is that the first spaced harmonic component ($n=1$) which is coupled to the fast cyclotron beam wave has a positive intercept on the *ka* axis of FIG. 6, and this value of *ka* may be relatively large. In a physical sense this means that the cross-sectional dimensions of the dumbbell shaped helix of FIG. 3 may be relatively large, thus simplifying the construction of the helix and simplifying the supporting structure for the dumbbell shaped helix.

The oupler circuit of the present invention, in which the bifilar helix is electrically excited in an odd mode and wherein the first spaced harmonic component of this odd mode is coupled to the fast cyclotron beam wave, has several advantages over prior known parametric amplifier coupler circuits wherein the attempt has been to couple the fundamental component ($n=0$) to the fast cyclotron beam wave. In this latter instance, use must be made of the dispersion characteristics of the fundamental component, and in such instance synchronization with the fast cyclotron beam wave can be achieved only at large values of $\beta_p$. As mentioned previously, this leads to increased noise and attenuation of the signal on the fast cyclotron beam wave. Furthermore, in order to achieve synchronization, the fast cyclotron wave curve must have a lower $\omega_c$ intercept on an $\omega-\beta$ diagram of the type illustrated in FIG. 5. To obtain this lower cyclotron resonance frequency $\omega_c$ the axial focussing magnetic field must be weaker, which may cause the focussing of the electron beam to be poor. Both of these features result in a parametric amplifier having poorer operating characteristics than a parametric amplifier constructed in accordance with this invention.

Figure 7:
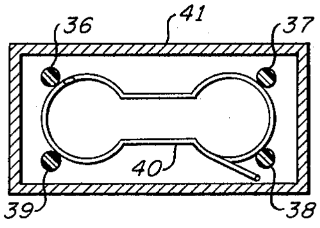
FIG. 7 is an illustration of an alternative embodiment of the present invention employing a shielding structure positioned about the coupler circuit of FIG. 1.

In the traveling wave coupler circuit of this invention synchronous phase velocities in the range of twenty to thirty percent of the velocity of light have been achieved for the coupler circuit operating over a bandwidth of ten percent in the S-band of the microwave frequency spectrum. This has been achieved with an open dumbbell shaped helix, that is, no shielding or loading was employed to affect the propagating characteristics of the waves on the helix structure. This range of phase velocities does not represent a limit on the capabilities of the coupler circuit of this invention, and even higher synchronous phase velocities may be achieved by shielding or otherwise loading the helix structure. For example, I have found that the synchronous phase velocities may be increased at some slight sacrifice in bandwidth by employing a shielding structure comprised of a rectangular uniconductor waveguide disposed about the dumbbell shaped helix in the manner illustrated in FIG. 7, wherein the dumbbell shaped helical structure 40 is symmetrically disposed within the rectangular waveguide section 41 and is supported therein by means of the dielectric rods 36, 37, 38, and 39, which in turn are supported by apertured end plates that extend across waveguide section 40 at opposite ends of the dumbbell shaped helical structure 41. I have found that not only is the phase velocity increased by employing waveguide section 41 as a shield, but additionally I have found that the group velocity of the waves on the circuit increase by as much as thirty percent over that of the unshielded dumbbell shaped helical structure. Further, this increased group velocity is a function of the width of the rectangular waveguide section, so by choosing the correct width of the rectangular waveguide section 41 a desired increased value of group velocity may be obtained. This feature gives the designer of the coupler circuit considerably more independence in selecting the various parameters of the coupler circuit since in this embodiment of the invention it is not necessary to change the pitch angle and diameter of the dumbbell shaped helical structure in order to change the group velocity. As one illustrative example of the shielded dumbbell shaped helix of the type illustrated in FIG. 7, a helical structure designed to operate in the S-band range of the frequency spectrum was enclosed within a standard sized C-band rectangular waveguide and it was found that the group velocity was thirty percent greater than for the unshielded dumbbell shaped helical structure. The group velocity decreases as the width of the rectangular waveguide is increased, and a narrowing of the width by a factor of ten percent will bring the group velocity down to substantially that of the unshielded structure. The use of the rectangular waveguide shield 41 of FIG. 7 has negligible effect on the transverse interaction impedance of the coupling circuit so that the advantages gained in achieving higher group and phase velocities requires no sacrifice of other desirable characteristics of the dumbbell shaped helical structure.

The above-mentioned values of synchronous phase velocity achieved with the coupling circuit of this invention may be compared with values in the range of six percent of the velocity of light that have been reported for prior art traveling wave coupler circuits.

Figure 8:
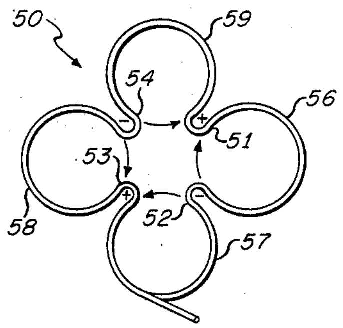
FIG. 8 is an end view of the pump wave coupler employed in the amplifier of FIG. 1.

The pump circuit that may be employed in a high frequency parametric amplifier to produce the quadrupole rotating electric field of the pump waves is illustrated in FIG. 8, and is comprised of an axially-extending quadrafilar wire helix 50 whose transverse cross-sectional configuration has been fashioned to provide the four inwardly-positioned excursions 51–54 and intermediately positioned outwardly-extending excursions 56–59, thereby forming a "clover leaf" or "turnstile" type of configuration. The electrical length around one turn of each individual wire of quadrafilar helix 50 is substantially equal to two wavelengths at the pump frequency so that the diametrically opposite inwardly-positioned excursions 51 and 53 are excited in like phase and the other pair of inwardly-positioned excursions 52 and 54 are excited in like phase with respect to each other and 180° out of phase with respect to the first pair 51–53, thereby to provide the rotating quadrupole electric pump field as diagrammatrically illustrated in FIG. 8. The electric field supported by the inwardly-positioned excursions 51–54 is a traveling wave field characterized by a high transverse interaction impedance that achieves efficient pumping of the orbiting electrons of the beam, thereby to amplify the input signal carried on the fast cyclotron wave of the beam. In this circuit the second space harmonic component ($n=2$) is coupled to the fast cyclotron beam wave.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An electromagnetic wave coupler for coupling the transverse electric field of traveling electromagnetic waves to a fast cyclotron wave of an axial electron beam, said coupler comprising, a plurality of *n* elongated conductors successively wound in spaced apart relationship about a longitudinal axis thereby forming a multifilar helix-like structure, wherein *n* is an integer greater than one, a plurality of *n* outwardly-extending excursions and a like number of intermediately disposed central portions forming each convolution of each of said conductors, said excursions and central portions being disposed in a symmetrical manner about said axis, and said central portions lying on a circle whose diameter is no greater than $4d$, where *d* is the diameter of said electron beam.

2. The combination as claimed in claim 1 wherein said central portions extend solely transversely to said axis and are aligned in successive parallel, solely transverse planes throughout the length of said helix-like structure.

3. The combination as claimed in claim 1 and further including, means for electrically exciting the respective lengths of conductive material with components of a traveling electromagnetic wave that are phase displaced with respect to each other to produce a transverse electric field that is concentrated between the central portions in each of said transverse planes.

4. A traveling wave coupler for coupling the transverse electric field of traveling electromagnetic waves to the fast cyclotron wave of an axially-directed electron beam, said coupler comprising the combination, a multifilar helix-life structure having a dumbbell shaped transverse cross sectional configuration comprised of first and second straight central portions symmetrically positioned on opposite sides of a longitudinal axis traversed by said beam, said straight central portions being disposed in pairs in successive transverse planes along the length of said structure, means for coupling signal frequency traveling electromagnetic waves to said multifilar helix to excite the pair of straight central portions in each transverse plane in 180° phase relationship to establish a transverse electric field therebetween.

5. An electromagnetic wave coupler for coupling traveling electromagnetic waves to an electron beam wave comprising the combination, a plurality of lengths of conductive material successively wound in spaced-apart relationship about a longitudinal axis thereby forming a multifilar helix-like structure, each convolution of each of said lengths of material having first and second transversely-extending central portions closely spaced with respect to each other and symmetrically positioned on opposite sides of said axis, and further having respective circularly-shaped end portions of equal diameters transversely and symmetrically positioned on opposite ends of said central portions, said circularly-shaped end portions having diameters greater than the transverse separation between said central portions, and means for electrically exciting said structure to establish traveling electromagnetic waves that have a transverse electric field concentrated between said central portions.

6. In a fast cyclotron wave parametric amplifier the combination comprising, means for forming and directing a beam of electrons along an axis, means for immersing said electron beam in an axially-directed magnetic field of the correct strength to establish a desired cyclotron resonance frequency in said beam, a multifilar helical structure of wave conducting members surrounding said beam and in electromagnetic wave coupling relationship therewith over a given axial distance to effect substantially complete coupling of electromagnetic waves to said beam, each of said wave conducting members having a configuration in successive transverse planes comprised of a plurality of inwardly-positioned portions disposed proximate said beam and intermediate a like number of outwardly-extending excursions, means for electrically exciting said wave on said wave conducting members to propagate said wave in an odd harmonic component of the odd multifilar helix-like mode, whereby the electric field of said wave is transverse to said beam throughout the length of said structure.

7. A traveling wave coupler for coupling a transverse electric field component of traveling electromagnetic waves to the fast cyclotron wave of an axially-directed electron beam, said coupler comprising the combination, first and second elongated conductive members wound about the axis of said beam in spaced-apart relationship to form a bifilar helix-like structure, said structure having a transverse cross-sectional configuration comprised of a pair of transversely extending central portions closely spaced and symmetrically positioned on opposite sides of said axis and being further comprised of first and second circularly shaped end portions respectively positioned on opposite ends of said central portions, said end portions having diameters greater than the transverse separation therebetween said pair of central portions, means for electrically exciting said two conductive members in 180° phase relationship with electromagnetic waves at a signal frequency, the physical parameters of said helix-like structure being proportioned to provide a phase velocity for the first space harmonic component of the signal frequency waves propagating thereon that is synchronous with the phase velocity of the fast cyclotron beam wave over a given frequency range.

8. The combination claimed in claim 7 wherein the physical parameters of said helix-like structure are proportioned to provide a synchronous phase velocity for the first space harmonic component that is at least twenty percent of the velocity of light.

9. A traveling wave coupler for coupling a transverse electric field component of traveling electromagnetic waves to the fast cyclotron wave of an electron beam, said coupler comprising the combination, first and second elongated conductive members disposed about the axis of said beam in spaced-apart relationship to form a bifilar helix-like structure, said structure having a transverse cross-sectional configuration comprised of conductive portions closely-spaced and symmetrically positioned relative to said beam axis to support an electric field of said signal waves that is transverse to said axis and symmetrically oriented relative to said beam, said transverse cross-sectional configuration being further comprised of first and second circularly shaped end portions respectively positioned on opposite ends of said closely-shaped portions and having diameters greater than the transverse separation between said closely-spaced portions, means for electrically exciting said two conductive members in 180° phase relationship with electromagnetic waves at a signal frequency to excite the electric field on said structure in the odd bifilar helix mode, the characteristics of said beam and the parameters of said helix-like structure being proportioned at least approximately to satisfy the relationship $$ka=\left(\frac{\omega}{u_o}-\frac{\omega_c}{u_o}\right)a \sin \psi+n \cos \psi$$

wherein $k=\omega/c$, the quantity $ka$ is the ratio of the circumference of said helix-like structure to the free spaced wavelength of said signal waves, $\omega$ is the angular frequency of said signal waves, $\omega_c$ is the cyclotron frequency of orbiting electrons in the beam, $u_o$ is the D.C. beam velocity, and $\psi$ is the pitch angle of said helix-like structure, and $n$ is the number of the space harmonic component of the signal wave on the coupler to which the beam is coupled.

10. A traveling electromagnetic wave coupler for coupling a transverse electric field component of traveling electromagnetic waves to the fast cyclotron wave of an electron beam, said coupler comprising the combination, first and second elongated conductive members wound about the axis of said beam in spaced-apart relationship to form a bifilar helix-like structure, means for coupling traveling electromagnetic waves at a signal frequency onto said helix-like structure in the odd bifilar helix mode, said structure having a transverse cross-sectional configuration comprised of first and second central portions closed spaced and symmetrically positioned on opposite sides of said axis and being further comprised of first and second end portions respectively positioned on opposite ends of said central portions, said end portions conforming at least partially to sectors of circles whose diameters are greater than the transverse separation therebetween said pair of central portions, the physical parameter of said helix-like structure being proportioned to satisfy the relationship $\sin \psi = u_0/c$ wherein $\psi$ is the pitch angle of said helix-like structure, $u_0$ is the D.C. beam velocity, and $c$ is the velocity of light.

11. A traveling wave coupler for coupling a transverse electric field component of traveling electromagnetic waves to the fast cyclotron wave of an electron beam, said coupler comprising the combination, first and second elongated conductive members disposed about the axis of said beam in spaced-apart relationship to form a bifilar helix-like structure, said structure having a transverse cross-sectional configuration comprised of first and second straight portions closely spaced and symmetrically positioned on opposite sides of said beam axis to support an electric field of said signal waves that is transverse to said axis and symmetrically oriented relative thereto, said transverse cross-sectional configuration being further comprised of first and second circularly shaped end portions respectively positioned on opposite ends of said straight portions and having diameters greater than the transverse separation between said straight portions, means for electrically exciting said two conductive members in 180° phase relationship with electromagnetic waves at a signal frequency to excite said structure in the odd bifilar helix mode whose electric field is concentrated between said first and second straight portions throughout the length of said structure, the characteristics of said beam and the parameters of said helix-like structure being proportioned to substantially satisfy the relationships $$\sin \psi = \frac{u_0}{c} \text{ and } \cot \psi = \frac{\omega_c a}{u_0}$$

wherein $\psi$ is the pitch angle of said helix-like structure, $u_0$ is the D.C. beam velocity, $c$ is the velocity of light, $\omega_c$ is the cyclotron resonance frequency of the beam, and $2\pi a$ is the circumference of said structure taken in a transverse sectional plane.

12. The combination claimed in claim 11 wherein the parameters of said structure are proportioned to provide a synchronous phase velocity for the first space harmonic component of said odd bifilar helix mode that is at least twenty percent of the velocity of light.

13. The combination claimed in claim 11 and further including, conductive shielding means disposed about said helix-like structure in spaced relationship therefrom.

No references cited.

ROY LAKE, *Primary Examiner.*

D. R. HOSTETTER, *Assistant Examiner.*